US008266906B2

(12) United States Patent
Wu et al.

(10) Patent No.: US 8,266,906 B2
(45) Date of Patent: Sep. 18, 2012

(54) ASYMMETRIC SPLIT-INLET TURBINE HOUSING

(75) Inventors: Ko-Jen Wu, Troy, MI (US); Jian Jun Zhang, Rochester, MI (US); James C. Elmslie, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 682 days.

(21) Appl. No.: 12/401,762

(22) Filed: Mar. 11, 2009

(65) Prior Publication Data

US 2010/0229551 A1   Sep. 16, 2010

(51) Int. Cl.
  *F03B 3/16*    (2006.01)
  *F02D 23/00*   (2006.01)
  *F04D 29/44*   (2006.01)

(52) U.S. Cl. .......... 60/605.1; 60/602; 415/204; 415/205

(58) Field of Classification Search .................... 60/602, 60/605.1, 605.2, 624; 415/116, 202–205, 415/213.1
See application file for complete search history.

(56) References Cited

U.S. PATENT DOCUMENTS

| | | | | |
|---|---|---|---|---|
| 1,229,274 A | * | 6/1917 | Jack | 415/98 |
| 2,963,863 A | * | 12/1960 | Middlebrooks, Jr. | 60/805 |
| 4,179,892 A | * | 12/1979 | Heydrich | 60/605.2 |
| 4,294,073 A | | 10/1981 | Neff | |
| 5,605,045 A | * | 2/1997 | Halimi et al. | 60/607 |
| 6,941,755 B2 | | 9/2005 | Bucknell et al. | |
| 7,168,405 B2 | * | 1/2007 | Hartley, Jr. | 123/90.31 |
| 7,269,950 B2 | | 9/2007 | Pedersen et al. | |
| 2002/0119044 A1 | * | 8/2002 | O'Connor et al. | 415/204 |
| 2003/0053910 A1 | * | 3/2003 | Hosny | 415/205 |
| 2003/0230085 A1 | * | 12/2003 | Sumser et al. | 60/602 |
| 2005/0086936 A1 | * | 4/2005 | Bucknell et al. | 60/602 |

* cited by examiner

*Primary Examiner* — Quyen Leung
*Assistant Examiner* — Jose Gonzalez Quinones
(74) *Attorney, Agent, or Firm* — Cantor Colburn LLP

(57) ABSTRACT

A turbine housing for a turbocharger for use in a reciprocating internal combustion engine includes a housing having a housing axis and configured to house a rotatable shaft having a turbine wheel disposed thereon. The housing includes a volute having a volute chamber disposed around the housing axis for receiving the turbine wheel. The volute has a first volute inlet providing a first flow path in fluid communication with the volute chamber and second volute inlet providing a second flow path in fluid communication with the volute chamber. The first volute inlet is circumferentially spaced about the housing axis from the second volute inlet by a phase angle α. The first volute inlet is also radially spaced about the housing axis from the second volute inlet, and may also be axially spaced from the second volute inlet along the housing axis.

20 Claims, 6 Drawing Sheets

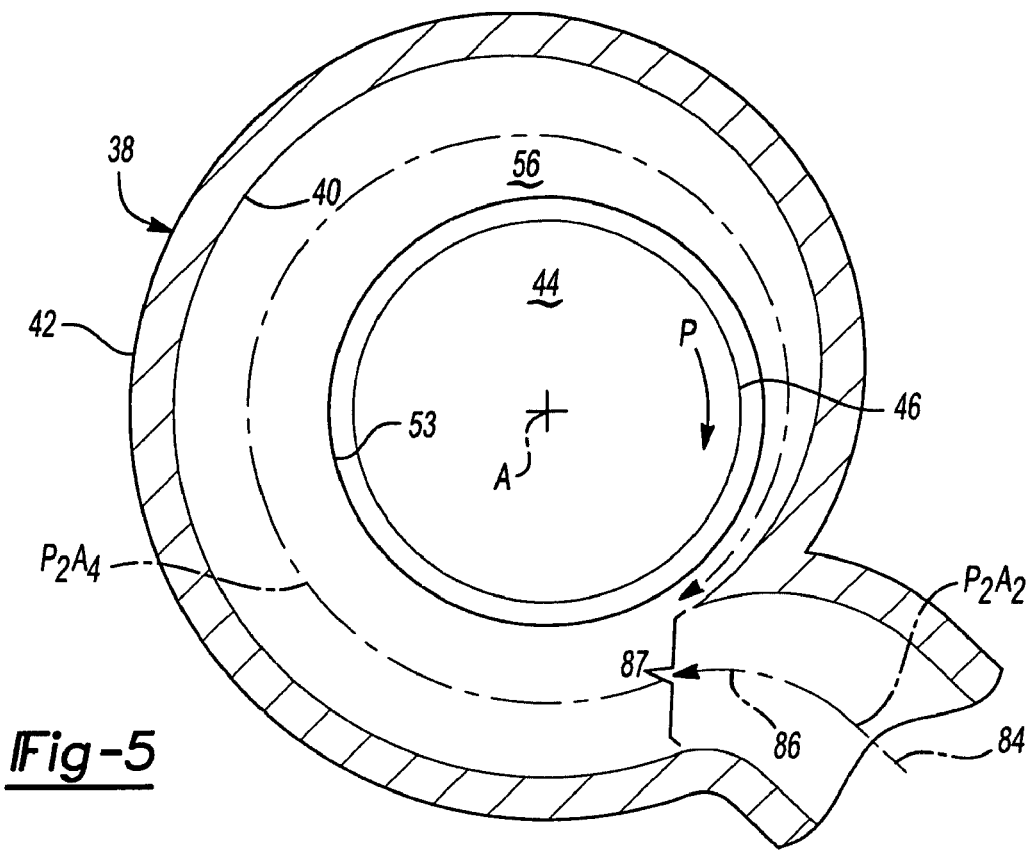
_Fig-5_
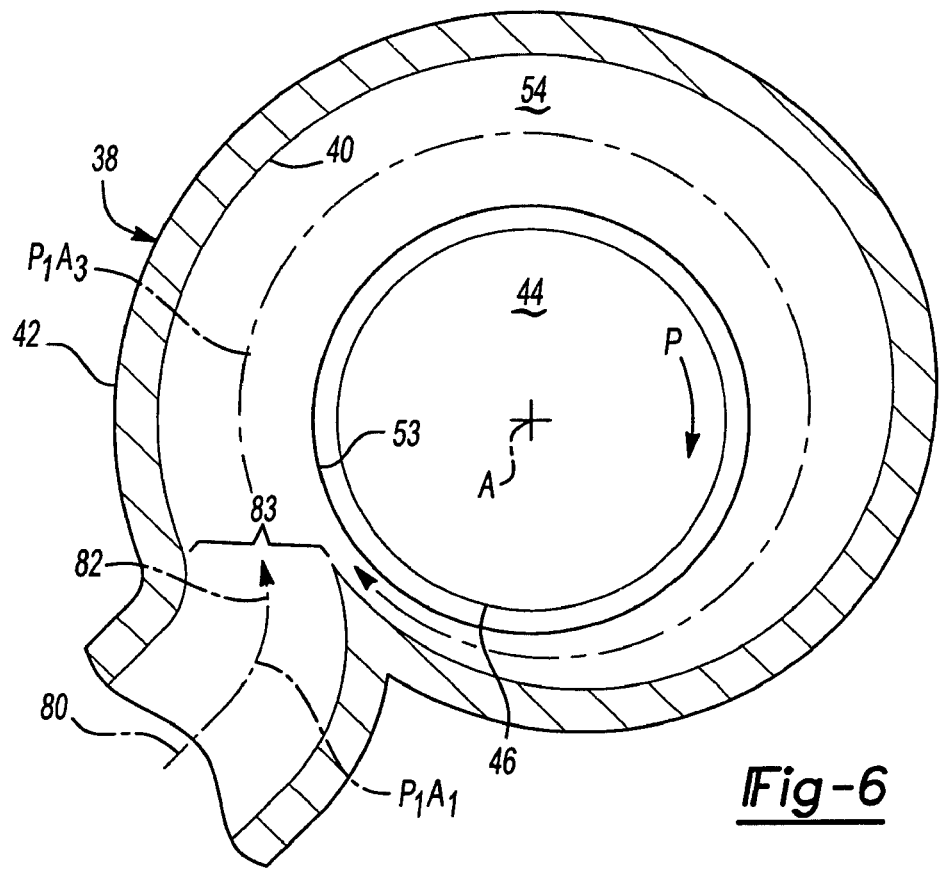
_Fig-6_

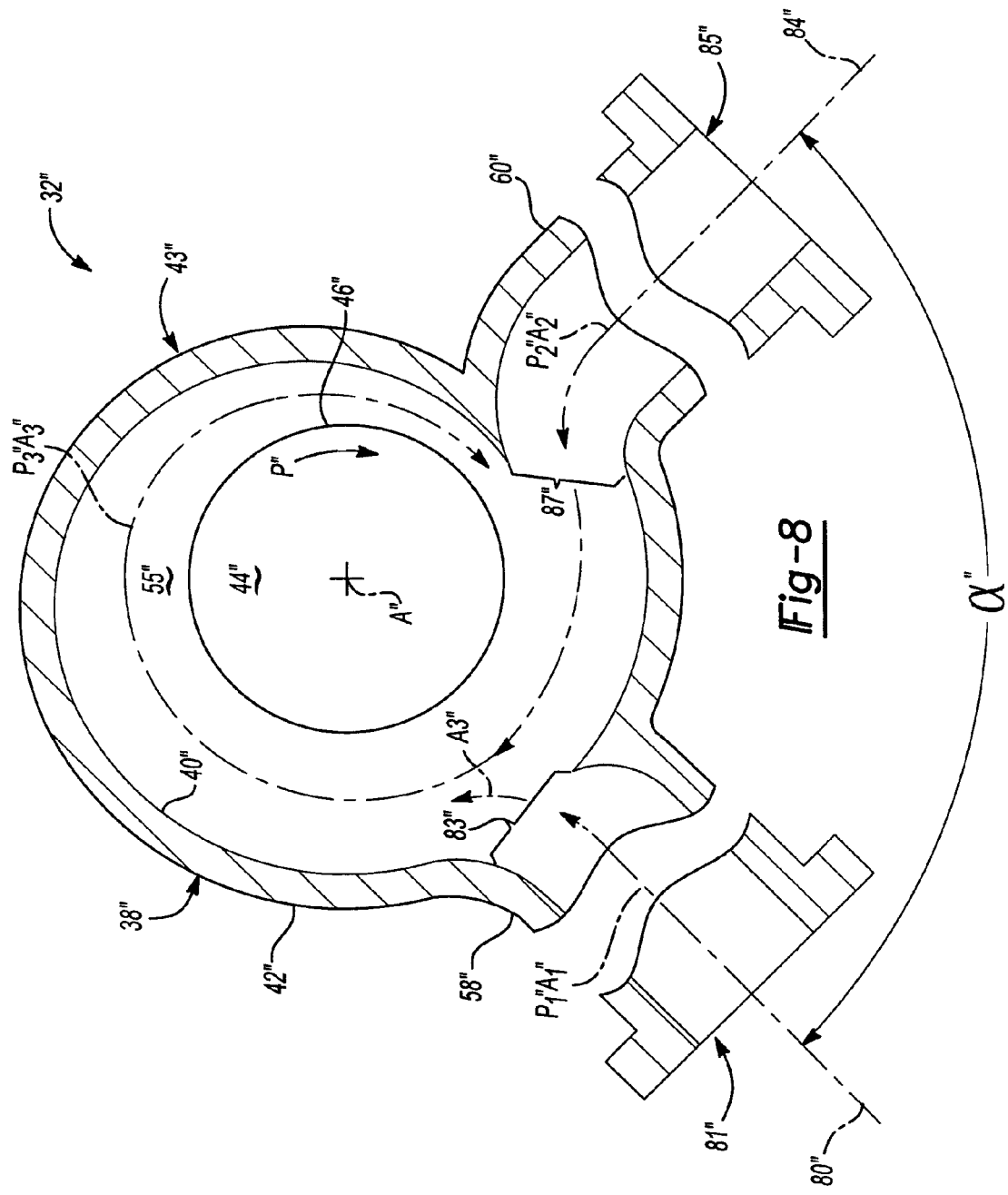

ASYMMETRIC SPLIT-INLET TURBINE HOUSING

FIELD OF THE INVENTION

The present invention relates generally to multi-cylinder, internal combustion engine assemblies, and more particularly, to turbochargers and associated turbine housings used therewith.

BACKGROUND

Turbocharging refers to methods of increasing the air or air/fuel mixture density of a motor vehicle engine by forced induction of the intake air stream into the engine cylinders. A turbocharger uses an air intake compressor that is powered by the engine exhaust stream to increase the pressure of the intake air. Turbocharging is particularly desirable because it provides a fuel-efficient method by which the power output of the engine may be increased on demand. Similarly, for a given power output requirement, a turbocharged engine may have a smaller displacement than an engine which does not utilize forced induction.

A turbocharger generally consists of a turbine wheel and a compressor wheel mounted on opposite ends of a shaft. These components are each isolated within a turbine housing that is configured to direct the exhaust stream from the engine across the blades of the turbine wheel causing it to spin thereby driving the shaft and the compressor wheel disposed thereon. Rotation of the compressor inducts air into the compressor housing where it is pressurized and then output to the engine intake manifold.

Because the speed of the compressor is dependent on the pressure of the exhaust gas stream driving the turbine wheel, there is frequently not enough pressure at the beginning moments of vehicle acceleration to provide the desired pressurization of the intake air causing turbo "lag". Furthermore, there is also frequently too much pressure at high engine output and peak engine RPM's that can cause over pressurization sufficient to cause damage to the engine and the turbocharger, such that a waste gate is commonly used to vent exhaust gas to avoid over pressurization of the system. These considerations have led to various approaches to provide more optimized output of the turbocharger, particularly in engines having separate cylinder banks, such as various opposed and V-type cylinder configurations.

One such approach has been the use of adjustable nozzles or vanes to provide increased pressure at low engine RPM's and exhaust output, which otherwise cannot be realized with a fixed geometry turbocharger. However, because of the relative complexity and cost of turbochargers incorporating variable nozzles, use in gasoline engines and small diesel engines has been limited. Another approach has been to incorporate twin turbochargers, one turbocharger for each cylinder bank, frequently oriented with turbine shafts rotating in opposite directions. Twin turbocharger configurations have been used in both outboard exhaust and inboard exhaust configurations. While the performance of twin turbocharger systems has been generally acceptable, they are generally undesirable because of the additional under-hood space required to house the additional turbocharger, particularly in the case of inboard twin turbochargers where both turbochargers must be housed in the space between cylinder banks, and also because of the cost of the additional turbocharger. Still another approach has been the use of various single turbocharger configurations, including both outboard exhaust and inboard exhaust configuration. Those in outboard configurations are cost effective but less efficient due to the necessity of routing the exhaust from the cylinder bank opposite the bank with which the turbocharger is associated. Furthermore, such designs are difficult to package under-hood due to the necessity of routing exhaust as described above. Likewise, single inboard turbochargers have been employed, but exhaust flow to the turbocharger is often compromised due to difficulty in proper routing of the exhaust gas from each of the cylinder banks to the turbine inlet, particularly where the exhaust ports are located outboard of the cylinder banks. With regard to the use of single turbochargers, various twin scroll designs have been proposed, however, such designs also have had the limitations described above associated with packaging of the turbocharger and routing of the exhaust to the turbine inlet. Further, such designs, while utilizing two scrolls, have placed them in symmetric configurations such that the inlet openings for both scrolls are positioned at the same radial location with reference to the center of rotation of the turbine wheel. This has necessitated that the exhaust gas stream or streams be channeled to this singular location for passage into the scrolls in conjunction with the operation of the turbine wheel, thus further constraining the routing of the exhaust conduits, which typically necessitates incorporation of sharp bends and other restrictions which affect the flow of the exhaust gases into the scrolls, thereby reducing the efficiency of the turbocharger and the engine.

In view of these and other limitations, improved turbine housing and turbocharger designs are desirable, as well as engines that are adapted to incorporate such designs.

SUMMARY OF THE INVENTION

According to one aspect of the invention, a turbine housing for a rotatable turbine wheel of a turbocharger for use in a reciprocating internal combustion engine includes a turbine housing having a housing axis and configured to house a rotatable shaft having a turbine wheel disposed thereon. The housing includes a volute having a volute chamber disposed around the housing axis for receiving the turbine wheel. The volute has a first volute inlet providing a first flow path in fluid communication with the volute chamber and second volute inlet providing a second flow path in fluid communication with the volute chamber. The first volute inlet is circumferentially spaced about the housing axis from the second volute inlet by a phase angle $\alpha$.

According to another aspect of the invention, a turbocharger for use in a reciprocating internal combustion engine includes a turbocharger housing and a shaft that is rotatably disposed within the turbocharger housing, the shaft having a first end and a second end. The turbocharger also includes a compressor wheel disposed on the first end of the shaft and a turbine wheel disposed on the second end of the shaft. The turbocharger housing includes a volute having a volute chamber disposed around a longitudinal axis of the shaft and the turbine wheel. The volute has a first volute inlet providing a first flow path in fluid communication with the volute chamber and a second volute inlet providing a second flow path and fluid communication with the volute chamber. The first volute inlet is circumferentially spaced about the axis of the shaft from the second volute inlet by phase angle $\alpha$.

According to another aspect of the invention, an engine assembly includes: an engine including a first cylinder bank having a first cylinder head and a second cylinder bank having a second cylinder head. The first cylinder bank and the second cylinder bank have an opposed or V-type configuration about a common crankshaft. The first cylinder head has a first inboard exhaust outlet and the second inboard cylinder head has a second inboard exhaust outlet. The engine assembly also includes a turbocharger assembly in fluid communication with the first and second cylinder heads. The turbocharger assembly has a turbine housing, comprising: a housing having a housing axis and configured to house a rotatable shaft having a turbine wheel disposed thereon; a volute having a volute chamber disposed around the housing axis for receiving the turbine wheel; a first volute inlet providing a first flow path and fluid communication with the volute chamber; and a second volute inlet providing a second flow path and fluid communication with the volute chamber, the first volute inlet circumferentially spaced about the housing axis from the second volute inlet by a phase angle α. The first volute inlet is fluidly coupled to the first exhaust outlet and the second volute inlet is fluidly coupled to the second exhaust outlet.

BRIEF DESCRIPTION OF THE DRAWINGS

Other features, advantages and details appear, by way of example only, in the following detailed description of embodiments, the detailed description referring to the drawings in which:

FIG. 5 illustrates a cross-sectional view of the turbine housing shown in FIG. 2 along Section 5-5;

FIG. 6 illustrates another cross-sectional view of the turbine housing shown in FIG. 2 along Section 6-6;

FIG. 8 illustrates a cross-sectional view of a third exemplary embodiment of a turbine housing.

DESCRIPTION OF THE EMBODIMENTS

Figure 1:
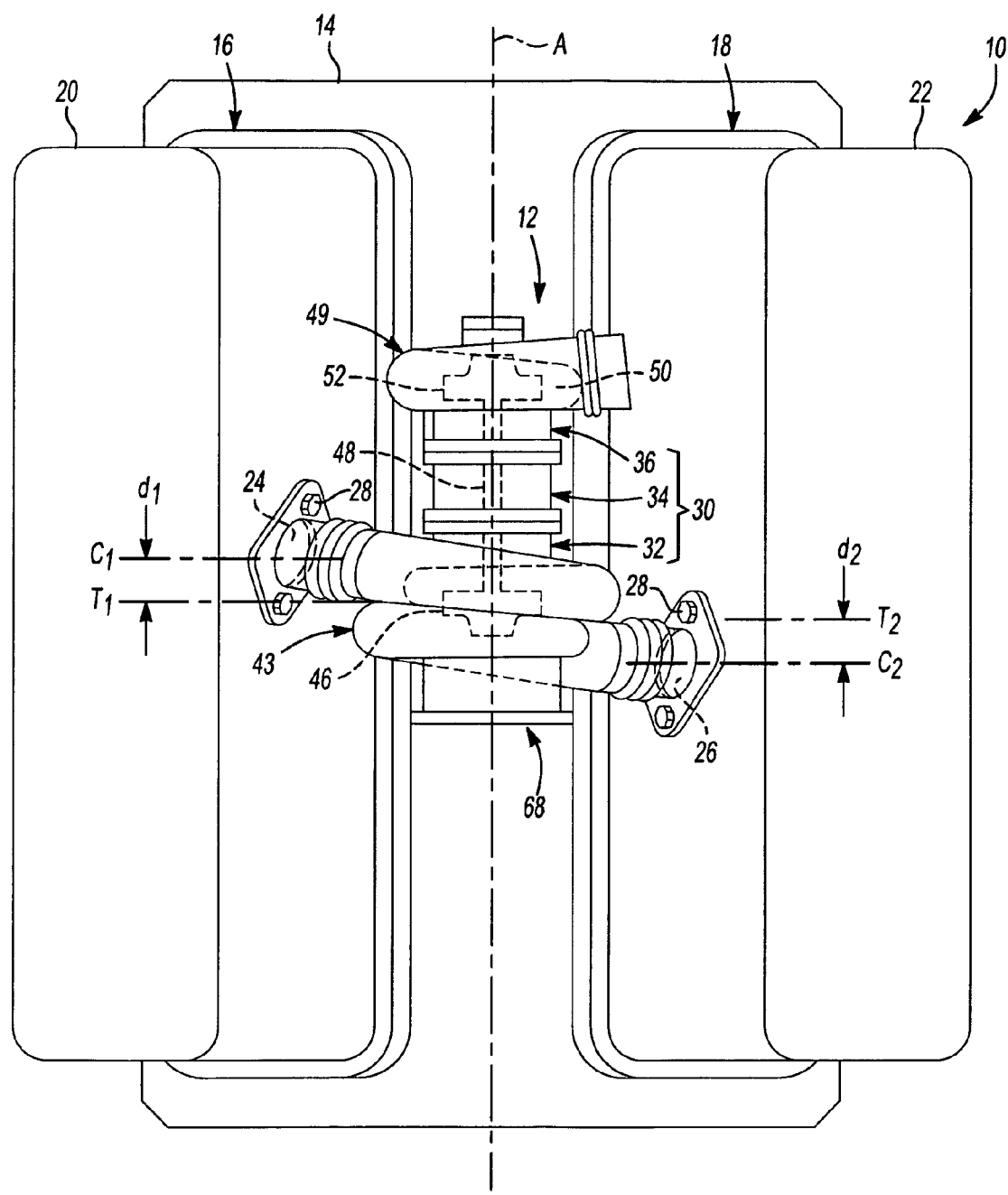
FIG. 1 illustrates a top schematic view of an exemplary embodiment of the engine and turbocharger assembly as disclosed herein.

The present invention provides improved turbine housings and turbochargers incorporating the same having improved fluid flow and other packaging and other operational characteristics, as well as cylinder heads and engine assemblies that incorporate these housings and turbochargers. One particular feature of the present invention includes a turbocharger for use with cylinder heads of an engine having integrally formed internal exhaust manifolds, which also have opposing inboard exhaust ports (i.e., ports that face inwardly toward one another about a mid-plane of the engine through the crankshaft axis). This configuration is particularly advantageous as it provides the ability to fluidly couple exhaust from circumferentially spaced cylinder banks in a multi-cylinder reciprocating internal combustion engine, such as 180° opposed banks of a twin or other multi-cylinder engine or a V-type engine (e.g., V4, V6, V8, V10 or otherwise), to a single turbocharger. Another feature comprises cylinder heads of a V-type engine having opposing inboard exhaust ports aligned with exhaust gas inlet conduits or conduits of the turbocharger assembly. This provides the ability to directly input the exhaust gas from the exhaust ports into the turbocharger without significantly changing the fluid flow direction. This provides enhanced exhaust flow and avoids flow restrictions and pressure drops, thereby enhancing the efficiency of exhaust utilization by the turbocharger and engine. Moreover, the turbine inlet conduits are configured to further direct exhaust gas flow from the cylinder heads to a volute chamber of a turbine housing so as to reduce losses in flow velocity and kinetic energy of exhaust gas flowing into and within the turbine housing. This is achieved by directing the exhaust gas into the turbine housing substantially in the same direction as it exits the exhaust outlets, i.e., tangentially to the turbine wheel, with respect to desired exhaust gas flow within the turbine housing. The elimination (or substantial reduction) of flow restriction associated with this design provides improved efficiency, power and responsiveness (i.e., reduced lag) of the turbocharger. Other features and advantages will become apparent from the description that follows.

In general, referring to FIGS. 1-4, an engine assembly 10 including a turbocharger assembly 12 is disclosed. Engine assembly 10 includes separated cylinder banks as part of a multi-cylinder reciprocating internal combustion engine. The cylinder banks are circumferentially spaced or separated about a common crankshaft operatively associated with pistons located within the respective cylinders of the engine. This includes engine configurations such as directly opposed cylinder banks having a 180° spacing of the cylinders, as well as V-type engine configurations, including V4, V6, V8, V10 and other V-shaped cylinder bank configurations. In an exemplary embodiment, the engine assembly 10 includes an engine block 14 having a first cylinder bank 16 and a second cylinder bank 18. Engine assembly 10 having a V-shape cylinder bank configuration includes a first cylinder bank 16 having a detachably attached first cylinder head 20 and a second cylinder bank 18 having a detachably attached second cylinder head 22. The first and second cylinder heads 20, 22 each include an integrally-formed internal exhaust manifold (not shown) having one or more exhaust channels (not shown) associated with each of the cylinders of the cylinder head that fluidly communicate exhaust gases produced during operation of engine assembly 10, to first exhaust port 24 and second exhaust port 26, respectively. Advantageously, first exhaust port 24 and second exhaust port 26 are in an opposing inboard exhaust port configuration where the port face inwardly toward one another about an imaginary longitudinal midplane of the engine. As a further advantage, first cylinder head 20 and second cylinder head 22 and their internal exhaust manifolds may be identical parts and reversed front to back on their respective cylinder banks 16, 18, which permits commonization and reduction of parts numbers associated with engine assembly 10. As still a further advantage, first exhaust port 24 and second exhaust port 26 may be located asymmetrically with respect to respective transverse axes $T_1, T_2$ of the respective cylinder heads 20, 22. In other words, the center of each of first exhaust port 24 and second exhaust port 26 as illustrated by $C_1, C_2$, respectively, may be offset from the respective transverse axis of the cylinder head with which it is associated $T_1, T_2$, a respective offset distance, $d_1, d_2$, with respect to its respective port 24, 26. The incorporation of the offsets $d_1, d_2$ is enabling of the advantageous turbine housing configurations described herein by providing axial separation of the exhaust ports and providing a sufficient space envelope for incorporation of the housing features described herein, particularly the twin scrolls or volutes, within a space envelope. The offsets $d_1$ and $d_2$ may be any distance effective to provide the desired separation of the exhaust ports. In an exemplary embodiment of the V-type engine, the offsets may be from about 1 to 5 inches depending on the size of the turbocharger, which, in turn, depends on the number of cylinders, cylinder diameters and other factors. For realizing the advantage of a single, common cylinder head design as described above, $d_1$ and $d_2$ would be kept the same.

The first exhaust port 24 and second exhaust port 26 are each configured to be fluidly coupled to the turbocharger assembly 12. Further, the first cylinder head 20 and second cylinder head 22 may each include mounting features, such as various flanges and threaded bores that may be used in conjunction with threaded bolts 28, for attachment of the turbocharger assembly 12 thereto.

The turbocharger assembly 12 includes a turbocharger housing 30. Turbocharger housing 30 is an assembly of turbine housing 32, bearing housing 34 and compressor housing 36. The turbine housing 32 includes a shell 38 with an interior surface 40 and an exterior surface 42 as shown in, FIGS. 2-4. The turbine housing 32 includes a turbine volute 43 having a turbine volute chamber 44 for receiving a turbine wheel 46 that is rotatably supported by a first end of a shaft 48 extending through and supported within the bearing housing 34. The compressor housing 36 defines a compressor volute 49 having a compressor volute chamber 50 for receiving a compressor wheel 52 that is rotatably supported by a second end of the shaft 48.

Referring to FIGS. 1-6, an exemplary embodiment of turbine housing 32 comprises a twin scroll or twin volute turbine housing 32 having a first turbine volute 43.1 and a second turbine volute 43.2 configured to form two fluid flow paths within turbine housing 32. Together first volute 43.1 and second volute 43.2 make up turbine volute 43. The two flow paths may be separated by a wall member or septum 53 (FIG. 4) that separates the turbine volute chamber 44 and together with the other portions of turbine volute 43 defines two separated fluid flow paths, namely first fluid flow path $P_1$ and second fluid flow path $P_2$, which flow through first scroll passage 54 and second scroll passage 56, respectively. Turbine volute chamber 44 includes both the central portion of the chamber where the turbine wheel 46 is located as well as first scroll passage 54 and second scroll passage 56. The interior surface 40 of the shell 38 includes a first scroll passage 54 and a second scroll passage 56 extending inwardly as spiral-like conduits about an axis (A) of the turbine housing 32, which may also be the axis of shaft 48. The first and second scroll passages 54, 56 and first flow path and second flow path, $P_1$, $P_2$, are located proximate the turbine wheel and are in fluid communication therewith. The turbine housing 32 also includes first exhaust inlet conduit 58 which together with first scroll passage 54 includes first fluid flow path $P_1$ between the first cylinder bank 16 and the turbine volute chamber 44. First inlet conduit 58 is configured to be sealingly and fluidly coupled to first exhaust port 24 and may also include a flexible section, such as a flexible bellows portion 59, to permit movement of first exhaust inlet conduit 58 to accommodate misalignment between first inlet conduit 58 and first exhaust port 24 due to manufacturing tolerance buildups or other factors associated with the assembly of turbocharger assembly 12, engine assembly 10, or both of them and to allow thermal expansion of the turbine housing as its temperature can vary from its designed operating temperature to ambient temperature when the engine is not operating. The turbine housing 32 also includes a second exhaust inlet conduit 60 which together with second scroll passage 56 includes second fluid flow path $P_2$ between the second cylinder bank 18 and the turbine volute chamber 44. Second inlet conduit 60 is configured to be sealingly and fluidly coupled to second exhaust port 26 and may also include a flexible section, such as a flexible bellows portion 61, to permit movement of second exhaust inlet conduit 60 to accommodate misalignment between second inlet conduit 60 and second exhaust port 26 due to manufacturing tolerance buildups or other factors associated with the assembly of turbocharger assembly 12, engine assembly 10, or both of them.

The first flow path $P_1$ includes a first axis $A_1$ and the second flow path $P_2$ includes a second axis $A_2$. The first inlet conduit 58 is fluidly coupled to the first exhaust port 24 through a first coupling feature 62, such as flange 62, which has a first passage inlet 81, using bolts 28 or band clamps or other fasteners or coupling means suitable to mount the turbocharger assembly 12 to the engine assembly 10. The second inlet conduit 60 is fluidly coupled to the second exhaust port 26 through a second coupling feature, such as flange 64, which has a second passage inlet 85, using bolts 28 or other fasteners or coupling means suitable to mount the turbocharger assembly 12 to the engine assembly 10. Other suitable mounting methods and means such as welding, clamping or the like may also be used to mount turbocharger assembly 12 to the engine assembly 10.

During operation of the engine assembly 10, exhaust gas generated by the engine exits first cylinder head 20 through first exhaust port 24 and second cylinder head 22 through second exhaust port 26 in respective exhaust gas pulse trains associated with the firing of the cylinders located within the respective cylinder heads. The exhaust gas exiting the first exhaust port 24 enters the first exhaust inlet conduit 58 of the turbine housing 32 and travels along the first flow path $P_1$ to the turbine volute chamber 44 through the first scroll passage 54. The exhaust gas exiting the second exhaust port 26 enters the second exhaust inlet conduit 60 of the turbine housing 32 and travels along the second flow path $P_2$ to the turbine volute chamber 44 through the second scroll passage 56. In this embodiment, the first and second flow paths $P_1$ and $P_2$ direct the exhaust gas substantially in the same direction as a turbine volute chamber flow path P defined by the spinning of turbine wheel 46. Moreover, the first and second flow paths $P_1$, $P_2$ are generally tangential to the volute chamber flow path P. The exhaust gas traveling along the first and second flow paths $P_1$, $P_2$, travels about the turbine housing 32 via first scroll passage 54 and second scroll passage 56, respectively, to engage blades of the turbine wheel 46. As the cross-sectional area of the first and second flow paths 54, 56 decrease in the direction of fluid flow the exhaust gas flow therein is forced into the volute chamber flow path P. Exhaust gas from volute chamber flow path exits the turbocharger into the vehicle exhaust system, either through an exhaust conduit or conduits attached to the first end 68 of turbine housing 32, or otherwise associated with shell 38.

Figure 2:
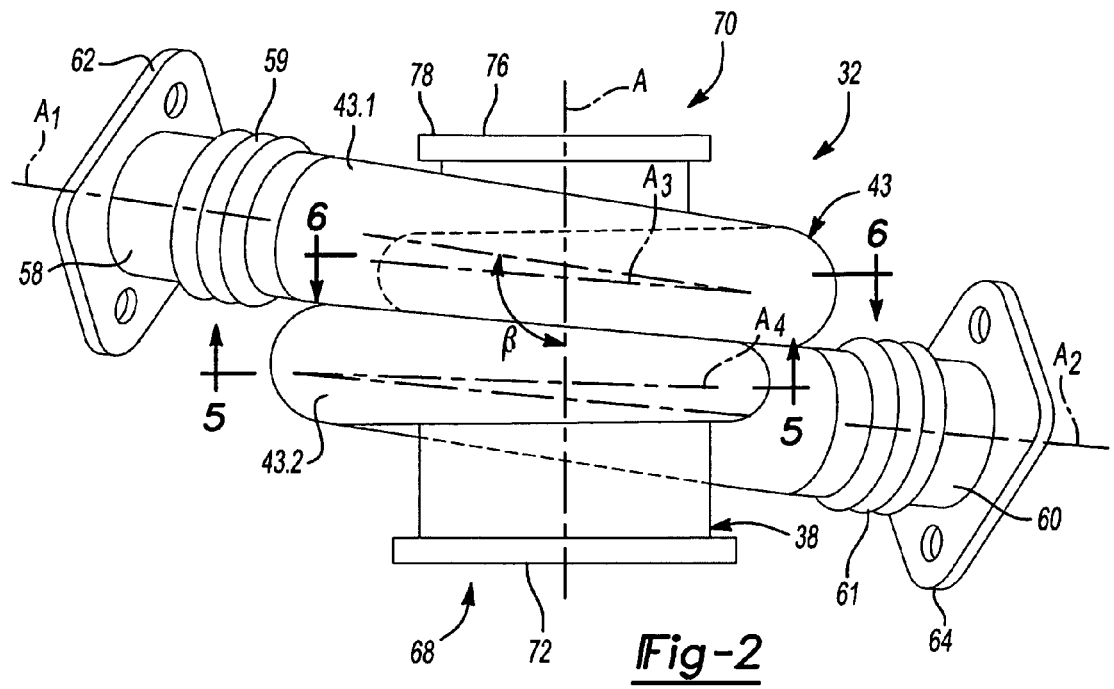
FIG. 2 illustrates a top schematic view of a turbine housing of a turbocharger assembly according to the teachings of the present invention.
Figure 3:
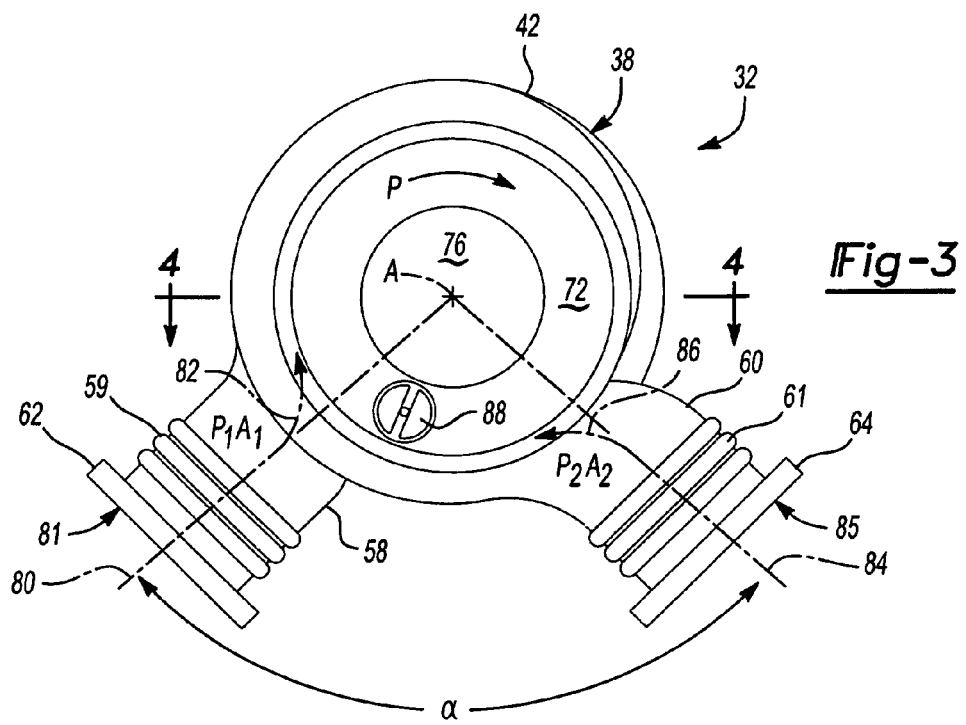
FIG. 3 illustrates a side view of the turbine housing shown in FIG. 2.

With reference to FIGS. 1-3, an exemplary embodiment of the turbine housing 32 of the turbocharger assembly 12 is shown. In this configuration, the turbine housing 32 forms the turbine volute 43 and turbine volute chamber 44 configured for receiving the turbine wheel 46. The turbine volute 43 and turbine chamber 44 are defined by the shell 38. Shell 38 may have any suitable shape, including the generally cylindrical shape shown in FIGS. 2 and 3. The shell 38 extends between a first end 68 and second end 70 of the turbine housing 32. The first end 68 of the turbine housing 32 includes a first opening 72 for providing egress of exhaust gas departing housing 32. Accordingly, the first end 68 of the turbine housing 32 includes a first attachment feature, such as a flange 74, that may be matingly engaged to an exhaust conduit (not shown) by a mating flange of an exhaust system of the engine assembly 10 using any suitable attachment means, such as a U-shaped band clamp (not shown). The second end 70 of the turbine housing 32 forms a second opening 76 for receiving shaft 48 and optionally a portion of a bearing assembly for the shaft 48 that is primarily housed within the bearing housing

34. The second end 70 of the turbine housing 32 includes a second attachment feature, such as a flange 78, which may be matingly engaged to an attachment feature, such as a flange, on the corresponding end of the bearing housing 34 with any suitable attachment means, such as a U-shaped band clamp (not shown).

Referring to FIGS. 1-4, the turbine housing 32 is formed about a housing axis A. The housing axis may comprise an axis of rotation of a turbine wheel 46 located within the turbine volute chamber 44, a center of the first opening 72, second opening 76, or both, a combination thereof or otherwise. In the embodiment illustrated in FIGS. 1-4, the housing axis A comprises the axis of rotation of the turbine wheel 46.

Referring to FIGS. 3, 5 and 6, the first axis $A_1$ of the first flow path $P_1$ varies in direction along the length of the first flow path. The first axis $A_1$ of the first flow path $P_1$ includes a first end 80 disposed proximate to the first exhaust inlet 81 turbine volute 44 and a second end 82 disposed proximate to the first volute chamber inlet 83. Similarly, the second axis $A_2$ of the second flow path $P_2$ also varies in direction along the length of the second flow path $P_2$. The second axis $A_2$ of the second flow path $P_2$ includes a first end 84 disposed proximate to the second exhaust inlet 85 and a second end 86 disposed proximate to the second volute chamber inlet 87.

In this configuration, the second ends 82, 86 of the first and second axes $A_1$, $A_2$ are located proximate to the first volute inlet 83 into first scroll passage 54 and the second volute inlet 87 into second scroll passage 56 and are oriented so that the first and second flow paths $P_1,P_2$ through them are substantially tangential with reference to the outer edge of the turbine wheel 46. This substantially tangential orientation is maintained throughout first scroll passage 54 and second scroll passage 56 by their spiral-like shape. This is a particularly advantageous orientation as the fluid flow velocity of the exhaust gases traveling along the first and second flow paths $P_1$, $P_2$ are less restricted since they enter the turbine volute chamber 44 with, and maintain flow generally in the same direction of, the volute chamber flow path P. Further, as the exhaust gases continue to travel along the first and second flow paths $P_1$, $P_2$ are generally in the same direction as the volute chamber flow path P, the exhaust gas entering the turbine volute chamber 44 is less disruptive to the existing flow within volute chamber flow path P in the turbine volute chamber 44. These spiral-like volute and flow path orientations are particularly advantageous as they provide for a more efficient and responsive turbocharger assembly 12 and hence engine assembly 10, as also further described herein.

The first volute inlet 83 into first scroll passage 54 and the second volute inlet 87 into second scroll passage 56 are circumferentially spaced from one another, and radially spaced about and axially spaced along the turbine axis A, as well as having the orientation of the first and second flow paths $P_1,P_2$ substantially tangential with reference to the outer edge of the turbine wheel 46 as described above. The circumferential spacing may be any suitable angular spacing. In the embodiment of FIGS. 1-6, given the substantially similar design of the scrolls 43.1,43.2 and the associated exhaust inlet conduits 58,60, portions of the first and second axes $A_1, A_2$ and respective first, and second exhaust inlet conduits 58,60 are disposed at an angle "α" with respect to one another as viewed from the perspective shown in FIG. 3. Angle α corresponds to the angular spacing and phase shift between first volute inlet 83 and second volute inlet 87. In the exemplary embodiment of FIGS. 1-6, in the twin scroll configuration, the angle α also represents the angular offset and phase shift between the scrolls, namely first turbine volute 43.1 and second turbine volute 43.2. The phase shifting of the scrolls in a twin scroll design may be altered to change the distribution of motive force associated with exhaust gases streams flowing in first and second flow path $P_1,P_2$ to the turbine wheel, such as to provide greater balancing or unbalancing of the gas flows and associated motive forces around the periphery of turbine wheel 46. This may, for example, either separately, or together with reduction of flow restrictions associated with this design, enable enhanced boost performance or reduction of the lag associated with turbocharger assembly 12. The circumferential spacing, including angle α between the first and second axes $A_1$, $A_2$, may be selected to provide any desired spacing and angular separation of first volute inlet 83 and second volute inlet 87, including any suitable phase shift for twin scroll designs, including any angle that provides suitable fluid coupling to interior portions of the first and second cylinder heads 20, 22, such as configurations that minimize the flow restrictions and pressure drops from the exhaust outlets 24,26 to the respective first and second volute inlets 83,87. For example, in exemplary embodiments for many v-type cylinder configurations, the angle separating first volute inlet 83 and second volute inlet 87 is between about 40° to 110°, or, more particularly, is between about 80° to 100° for many V-8 engines. These ranges of angular separation are suitable for many common V-type cylinder configurations; however, other angular ranges are contemplated, particularly where the angular separation of the cylinders is increased, including V-type engine configurations with high separation angles, as well as opposed cylinder configurations where the angular separation may be about 180°. In these configurations, the angular separation may be greater than 110°, up to about 180°.

The radial spacing of the first and second volute inlets 83,87 from the turbine axis will depend on the size of the turbine wheel, volumetric requirements of the scrolls and other known design considerations. The axial spacing of the first and second volute inlets 83,87 along the turbine axis will depend on configuration of the volute or volute, including whether the housing has a single scroll or a twin scroll. In a single scroll configuration (FIG. 8) their axial spacing will generally be relatively small, including a possibility of zero, and will depend on the axial extension of the volute spiral, the angular separation of the first and second volute inlets and other factors. In a twin scroll configuration (FIGS. 1-6) their axial spacing will generally be relatively larger than in a single scroll design, and will depend on the axial extension of both volute spirals, the angular separation of the first and second volute inlets and other factors.

Depending on the offset between exhaust port 24 and exhaust port 26 as described above, and the relative sizes of volute 43, in the twin scroll configuration illustrated in FIGS. 1-6, the first and second axes $A_1, A_2$ may be disposed at any suitable angle β to housing axis A as depicted in FIG. 2. Further, the angles made by first and second axes $A_1, A_2$ may be the same or different (i.e., $\beta_1$, $\beta_2$) depending on the factors mentioned above, as well as other associated factors. The angle β will be selected to provide a smooth transition from first exhaust port 24 and second exhaust port 26 to the turbine volute 43 so as to provide the necessary flow of exhaust gases to turbine wheel 46 with a minimum of restrictions, including changes of direction, and pressure drops. Referring to FIG. 2, in an exemplary embodiment the first and second axes, $A_1$, $A_2$, are disposed along planes that are generally parallel with respect to one another, which is desirable when a common cylinder head assembly is desired for both cylinder banks. Viewed from the top of turbine housing 32 as shown in FIG. 2, the first and second axes, $A_1$, $A_2$, are both disposed at an angle β with respect to the housing axis A. In this configuration, the first and second axes, $A_1$, $A_2$, are disposed at an angle $\beta$ that is generally non-perpendicular to the housing axis A; however, perpendicular configurations may also be used. For example, it is contemplated that the angle $\beta$ between the first and/or second axis, $A_1$, $A_2$, and the housing axis A may be between about 90° to 120°, and more particularly about 100°. Other configurations, including those having an angle $\beta$ of less than 90° are also possible.

Figure 4:
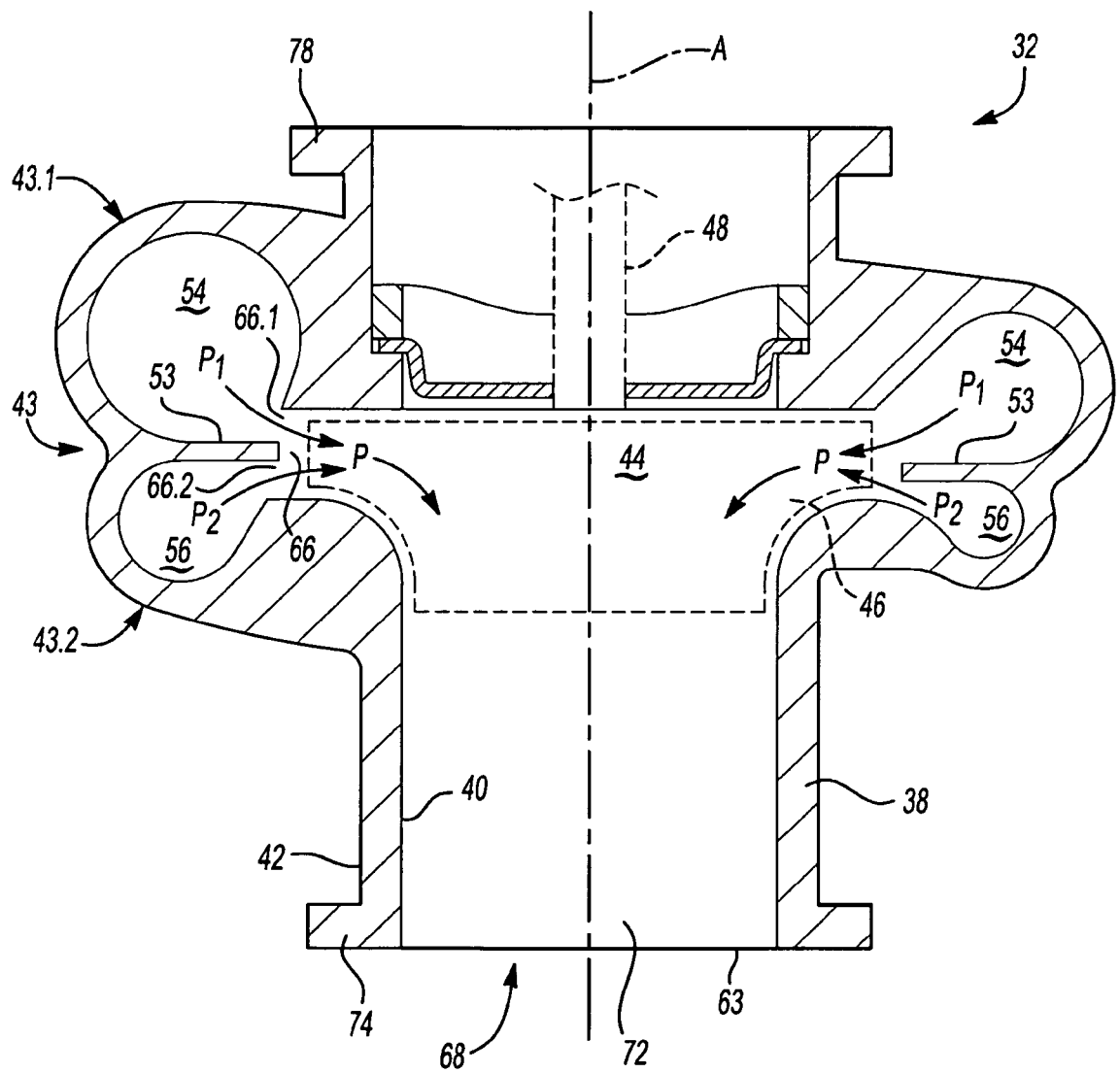
FIG. 4 illustrates a cross-sectional view of the turbine housing shown in FIG. 3 along Section 4-4.

As previously mentioned, and shown in FIGS. 5 and 6, in the twin scroll configuration shown, the exhaust gas traveling through the first and second flow paths, $P_1$, $P_2$, enter the turbine volute chamber 44 via first scroll passage 54 and second scroll passage 56, respectively. As the exhaust gas flows enter these passages and are forced through turbine inlet 66 which refers to the entire circumferential opening between the first and second scroll passages 54, 56, including first turbine inlet 66.1 and second turbine inlet 66.2, as shown in FIG. 4. A portion of the exhaust gas flow in each passage then continues to travel about the turbine volute chamber 44 via the first and second scroll passages 54, 56 and continues to pass through turbine inlet 66, including first turbine inlet 66.1 and second turbine inlet 66.2, as it does so. First turbine inlet 66.1 and second turbine inlet 66.2 are sized together with the first and second scroll passages 54, 56 and located proximate to the blades of the turbine wheel 46 such that movement of the exhaust gases through the first and second scroll passages 54, 56 and through respective first turbine inlet 66.1 and second turbine inlet 66.2 induces rotation of the turbine wheel 46. Movement of the exhaust gas into the turbine volute chamber 44 in the manner described is achieved through a continuously decreasing cross-sectional area of the first and second scroll passages 54, 56 in the direction of exhaust gas flowing therethrough, i.e., from the first volute inlet 83 and second volute inlet 87 to the volute chamber 44. This is particularly shown in FIG. 4, wherein the progressive reduction in cross-sectional areas of the first and second scroll passages 54, 56 can be seen. The first and second scroll passages 54, 56 may have any suitable shape and size (e.g., cross-sectional area) for directing exhaust flow therethrough, including circular or teardrop shapes, or otherwise.

Referring to FIGS. 2, 5 and 6, the first scroll passage 54 includes a first scroll axis $A_3$ that extends substantially tangentially about the housing axis A. Similarly, the second scroll passage 56 includes a second scroll axis $A_4$ that extends substantially tangentially about the housing axis A. In an exemplary embodiment, referring to FIG. 2, the first scroll axis $A_3$ and the second scroll axis $A_4$ are substantially perpendicular to the housing axis A. In a preferred embodiment a first scroll axis $A_3$ and a second scroll axis $A_4$ may have an axially extending, spiral-like shape, where they generally spiral inwardly toward the housing axis A while at the same time extending axially along housing axis A. The spiral-like path is preferred to efficiently direct the exhaust gases toward the turbine wheel 46 with a minimum of losses. The axially extending nature of the shape of first and second scroll axis $A_3$, $A_4$ provides the space envelope needed for the scrolls and accommodates the offsets between first exhaust port 24 and second exhaust port 26. In other words, the scrolls 43.1,43.2 may be designed so that their axial extension corresponds to the axial offset of the exhaust ports 24,26, so that the exhaust inlets openings 81,85 are proximate, and preferably aligned with, the exhaust outlets 24,26 in order to minimize pressure losses and flow restrictions in the exhaust fluid between the exhaust manifolds and the turbine wheel and promote enhanced responsiveness of the turbine wheel, as described herein.

Referring to FIGS. 3, 5 and 6, in an exemplary embodiment, the first and second scroll passages 54, 56 extend circumferentially in the manner described herein about the housing axis A for directing exhaust gas flow within the turbine volute chamber 44. They may extend circumferentially to any suitable extent about housing axis A. First scroll passage 54 and second scroll passage 56 may extend circumferentially to the same extent, or alternately, may extend circumferentially to different extents about housing axis A. In an exemplary embodiment, the first and second scroll passages 54, 56 extend at least about 90° and more particularly, at least about 180° or even more particularly at least about 270° about housing axis A. Similarly, in a preferred embodiment, the first and/or second scroll passages extend between about 180° to 360°, between about 225° to 315° or even more particularly about 270° about the housing axis A. For twin scroll designs, it would be preferred to keep the passage designs as close to 360° degrees as possible.

Figure 7:
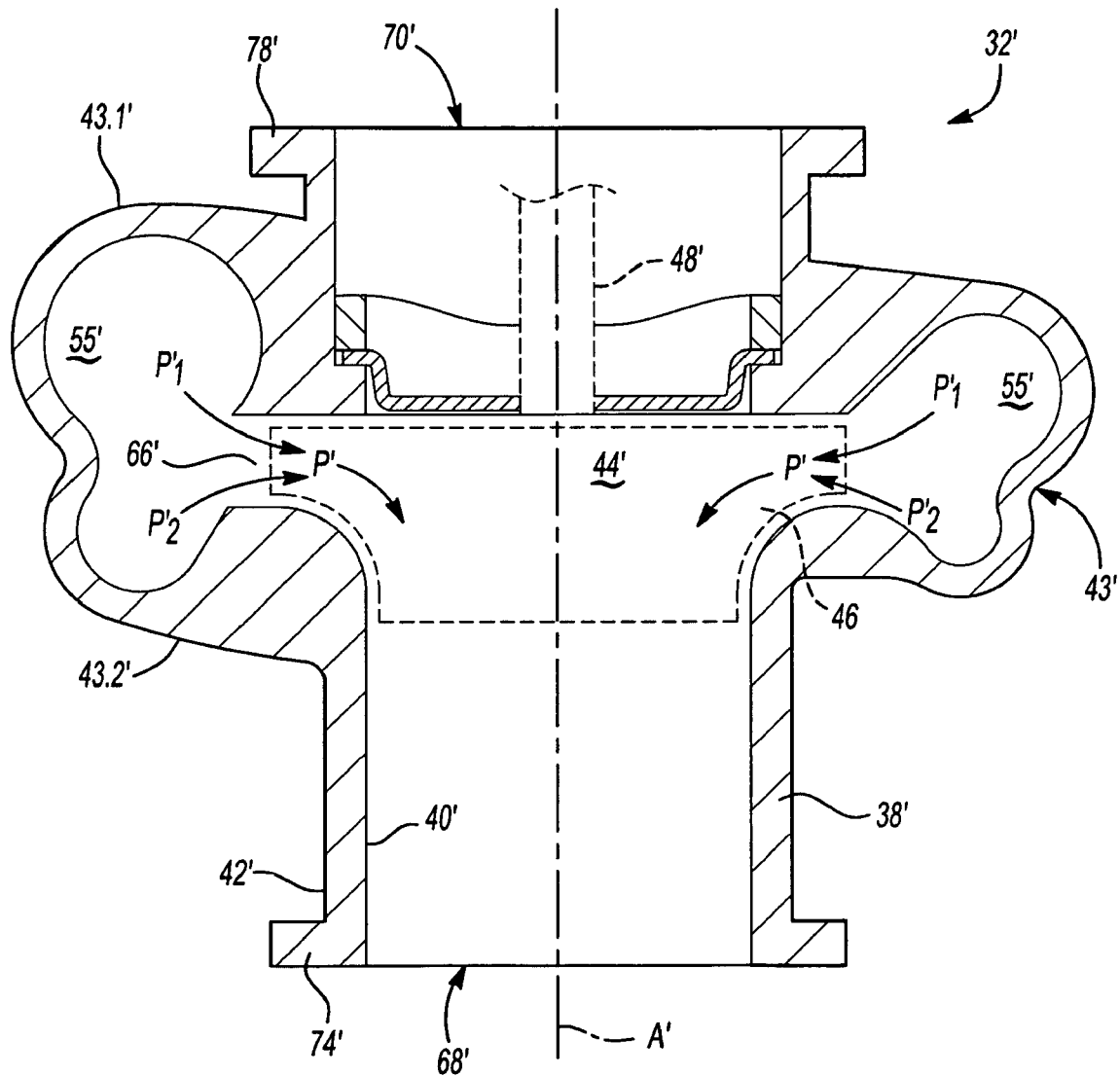
FIG. 7 illustrates a cross-sectional view of a second exemplary embodiment of a turbine housing.

FIG. 7 illustrates a second embodiment of turbine housing 32' and volute 43' in a modified twin scroll configuration. This embodiment is generally similar to that described above with reference to FIGS. 1-6, except that septum 53 has been eliminated and thus volute 43' includes a hybrid single scroll passage made by combining two scrolls, rather than a true twin scroll configuration. Thus, twin scroll 43' includes a first flow path $P_1'$ and a second flow path $P_2'$ within a single scroll passage 55'. The single scroll passage 55' is formed as a combination of twin scrolls 43.1' and 43.2'. The use of single scroll passage 55' will be expected to permit some intermixing of exhaust gases flowing along first flow path $P_1'$ and second flow path $P_2'$. The shell 38', including interior surface 40' and exterior surface 42' are substantially identical to the shell 38, interior surface 40 and exterior surface 42 described above with regard to the embodiment of FIGS. 1-6, except that it does not incorporate a septum to form two flow passages, but rather has single scroll passage 55' as described above. The turbine volute chamber 44' is also identical to that of the embodiment described above with reference to FIGS. 1-6, with the exception that there is a single turbine inlet 66' rather than two turbine inlets due to the absence of the septum. Otherwise, turbine housing 32' is adapted to receive turbine wheel 46' and turbine shaft 48'. Exhaust flows to first end 68' and flange 74' is incorporated that may, for example, be matingly engaged to an exhaust conduit (not shown) by a mating flange of an exhaust system of an engine assembly. The second end 70' is adapted to receive a bearing assembly by incorporation of a flange 78' that may be matingly engaged to an attachment feature, such as a flange, on the corresponding end of a bearing housing, as described herein. However, the workings of the turbine will otherwise be as described above with respect to FIGS. 1-6. Exhaust gases flowing along first flow path $P_1'$ and second flow path $P_2'$ will be forced by the progressive reduction in cross-sectional area of scroll passage 55' through turbine inlet 66', but will otherwise be operative to drive turbine wheel 46' in the manner described herein with respect to the embodiment of FIGS. 1-6. This embodiment has advantages similar to those described above with respect to the embodiment illustrated in FIGS. 1-6, in that the first volute inlet (not shown) and first flow path $P_1'$ and second volute inlet (not shown) and second flow path $P_2'$ are circumferentially spaced, such as by being separated by a phase angle $\alpha$. Therefore the exhaust flows from the cylinder banks associated with these flow paths can be introduced to the turbine wheel with a phase separation as described above. This phase separation, i.e., phase angle $\alpha$, can be selected to obtain the desired performance from the turbine wheel, and hence from the turbocharger, such as a reduction in turbocharger lag, balanced or unbalanced loading of the turbine wheel by the respective exhaust flows and the like.

A third embodiment of a turbine housing 32" is illustrated in FIG. 8. In this embodiment, a single scroll 43" includes a single volute or scroll passage 55" that includes two separate exhaust inlets, namely first volute inlet 83" and second volute inlet 87". These volute inlets are associated with respective inlet conduits, namely first inlet conduit 58" and second inlet conduit 60". In this embodiment, first flow path $P_1$" is provided through first volute inlet 83" and inlet conduit 58" and second flow path $P_2$" is provided within second volute inlet 87" and second inlet conduit 60". The first flow path $P_1$" has a first axis $A_1$" within first inlet conduit 58" and second flow path $P_2$" has a second axis $A_2$" within second inlet conduit 60" and an initial portion of scroll passage 55" prior to first volute inlet 83" at this juncture, first flow path $P_1$" and second flow path $P_2$" merge into a single flow path $P_3$" having an axis $A_3$". These flow paths and the associated exhaust gas streams flowing therein merge and intermix within scroll passage 55" beginning at first volute inlet 83". The cross-sectional area of scroll passage 55" is progressively reduced along the length of scroll passage 55", as illustrated in FIG. 8. This reduction may begin at first volute inlet 83". Alternately, the reduction of cross-sectional area of scroll passage 55" may begin at second volute inlet 87". A suitable single turbine inlet (not shown) will be provided and will have an inlet size selected to permit the progressive reduction in cross-sectional area of scroll passage 55" to cause the exhaust gases to be forced into the turbine volute chamber 44" thereby causing a turbine wheel (not shown) to spin in the manner described herein. Otherwise, the components of turbine housing 32" and the associated turbocharger will be similar to that described herein with regard to the embodiment of FIGS. 1-6. This embodiment has the advantage of a phase-separated introduction of the exhaust gas flow streams associated with the respective cylinder banks through separate exhaust inlets into the turbine housing 32".

Separation of the exhaust inlets in the embodiments described herein is a significant advantage over prior single and twin scroll designs as it provides more flexibility with respect to location of the turbocharger with respect to the engine within the engine compartment. Specifically, it enables location of the turbocharger between the cylinder banks in the manner described herein, and having the associated operational advantages described herein, including reducing pressure losses and minimizing restrictions in the exhaust flow paths between the exhaust outlets of the respective cylinder banks and the associated exhaust inlets of the turbine housing. It also provides advantages with respect to phase separated application of the exhaust flow streams to the turbine wheel as described herein by virtue of the separation of the first volute inlet 83" and associated first exhaust inlet 81" and second volute inlet 87" and associated second exhaust inlet 85" by the phase angle α.

It will be appreciated that for any of the disclosed embodiments the turbine housing may include one or more additional components for assisting in the function of the turbocharger assembly. For example, the turbine housing may include a wastegate valve disposed in the shell for providing pressure relief in the turbine volute chamber and prevent the turbine from being over-pressurized and spun at an undesirable speed. The wastegate valve may comprise any suitable wastegate valve and may be installed in the shell through any suitable means and at any suitable location. For example, the wastegate valve may be disposed at the first end of the turbine housing such that exhaust gas flow therethrough is generally parallel with respect to the housing axis A. Advantageously, this limits interference with the movement of the exhaust gas about the turbine volute chamber and in the scroll passage or passages. The wastegate flow passages are then arranged so each is properly connected proximately to the respective turbine wheel inlet conduit.

In view of the foregoing, it should be appreciated that the turbocharger assembly of the present invention may be used with any suitable engine assembly configuration adapted for use with a turbocharger assembly. This includes diesel engines, gasoline engines or otherwise. As such, it should be appreciated that the specific size, shape and configuration of the turbocharger assembly, particularly the turbine housing may vary. In one particularly advantageous application, the turbocharger assembly is particularly suited for use with engines having dual cylinder banks separated to form a V-type engine, such as a V4, V6, V8, V10 or V12 engine. Moreover, this is particularly advantageous in configurations where the V-type engine includes cylinder heads having integrally formed internal exhaust manifolds with inboard inwardly facing exhaust ports for direct connection to the exhaust inlets of the turbine housing. However, turbine housings and turbochargers disclosed herein may also be used in configurations where they are not directly connected to the exhaust ports, but rather are in fluid communication with other exhaust components such as exhaust manifolds, exhaust pipes or otherwise.

While exemplary embodiments have been described and shown, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A turbine housing for a rotatable turbine wheel of a turbocharger, comprising:
   a housing having a housing axis and configured to house a rotatable shaft having a turbine wheel disposed thereon;
   a volute having a volute chamber disposed around the housing axis for receiving the turbine wheel;
   a first volute inlet providing a first flow path and fluid communication with the volute chamber; and
   a second volute inlet providing a second flow path and fluid communication with the volute chamber, the first volute inlet circumferentially spaced about the housing axis from the second volute inlet.

2. The turbine housing of claim 1, wherein the first volute inlet is axially spaced along the housing axis from the second volute inlet.

3. The turbine housing of claim 1, wherein the circumferential spacing comprises a phase angle a of about 40° to 110°.

4. The turbine housing of claim 1, wherein the housing comprises a single volute having a single volute passage that curves inwardly toward and is in fluid communication with the turbine volute chamber, the single volute passage comprising the first flow path and second flow path.

5. The turbine housing of claim 1, wherein the housing comprises a first volute and a second volute having a shared volute passage that curves inwardly toward and is in fluid communication with the turbine volute chamber, the volute passage comprising the first flow path associated with the first volute and the second flow path associated with the second volute.

6. The turbine housing of claim 1, wherein the housing comprises a first volute having a first volute passage that curves inwardly toward and is in fluid communication with the turbine volute chamber, the first volute passage comprising the first flow path, and a second volute having a second volute passage that curves inwardly toward and is in fluid communication with a turbine volute chamber, the second volute passage comprising the second flow path.

7. The turbine housing of claim 6, wherein the first volute passage and second volute passage are separated by a septum extending therebetween.

8. The turbine housing of claim 6, wherein the first volute passage has a first cross-sectional area and the second volute passage has a second cross-sectional area, and wherein each of the first cross-sectional area and second cross-sectional area each generally decrease in a direction from the first volute inlet and the second volute inlet, respectively toward the turbine volute chamber.

9. A turbocharger, comprising:
a turbocharger housing;
a shaft that is rotatably disposed within the turbocharger housing, the shaft having a first end and a second end;
a compressor disposed on the first end of the shaft; and
a turbine wheel disposed on the second end of the shaft, the turbocharger housing comprising a volute having a volute chamber disposed around a longitudinal axis of the shaft and the turbine wheel, the volute having a first volute inlet providing a first flow path and fluid communication with the volute chamber and a second volute inlet providing a second flow path and fluid communication with the volute chamber, the first volute inlet circumferentially spaced about the axis of the shaft from the second volute inlet.

10. An engine assembly, comprising:
an engine comprising a first cylinder bank having a first cylinder head and a second cylinder bank having a second cylinder head, the first cylinder bank and the second cylinder bank having an opposed or V-type configuration about a common crank shaft, the first cylinder head having a first inboard exhaust outlet and the second cylinder head having a second inboard exhaust outlet; and
a turbocharger assembly in fluid communication with the first and second cylinder heads, the turbocharger assembly having a turbine housing, comprising:
a housing having a housing axis and configured to house a rotatable shaft having a turbine wheel disposed therein;
a volute having a volute chamber disposed around the housing axis for receiving the turbine wheel;
a first volute inlet providing a first flow path and fluid communication with the volute chamber; and
a second volute inlet providing a second flow path and fluid communication with the volute chamber, the first volute inlet circumferentially spaced about the housing axis from the second volute inlet, the first volute inlet fluidly coupled to the first exhaust outlet and the second volute inlet fluidly coupled to the second exhaust outlet.

11. The engine assembly of claim 10, wherein the housing comprises a single volute having a single volute passage that curves inwardly toward and is in fluid communication with the turbine volute chamber, the single volute passage comprising the first flow path and second flow path.

12. The engine assembly of claim 10, wherein housing comprises a first volute and a second volute having a shared volute passage that curves inwardly toward and is in fluid communication with the turbine volute chamber, the volute passage comprising the first flow path associated with the first volute and the second flow path associated with the second volute.

13. The engine assembly of claim 10, wherein the housing comprises a first volute having a first volute passage that curves inwardly toward and is in fluid communication with the turbine volute chamber, the first volute passage comprising the first flow path, and a second volute having a second volute passage that curves inwardly toward and is in fluid communication with a turbine volute chamber, the second volute passage comprising the second flow path.

14. The engine assembly of claim 10, wherein the phase angle $\alpha$ is about 40° to 110°.

15. The engine assembly of claim 10, wherein the first cylinder head and the second cylinder head are interchangeable.

16. The engine assembly of claim 10, wherein the turbocharger assembly is located between the first cylinder head and the second cylinder head.

17. The engine assembly of claim 16, wherein the housing comprises a first exhaust conduit that is fluidly coupled to the first exhaust outlet and in fluid communication with the first volute inlet, and a second exhaust conduit that is fluidly coupled to the second exhaust outlet and in fluid communication with the second volute inlet.

18. The engine assembly of claim 17, wherein the first exhaust conduit has a first flexible section and the second exhaust conduit has a second flexible section.

19. The engine assembly of claim 10, wherein the first exhaust outlet and the second exhaust outlet are axially offset with respect to one another.

20. The engine assembly of claim 10, wherein the first cylinder head includes a first integrally formed internal exhaust manifold in fluid communication with the first exhaust outlet and the second cylinder head includes a second integrally formed internal exhaust manifold in fluid communication with the second exhaust outlet.

* * * * *